(12) United States Patent
Lee et al.

(10) Patent No.: US 9,794,529 B2
(45) Date of Patent: Oct. 17, 2017

(54) METHOD FOR ACQUIRING IMAGE AND ELECTRONIC DEVICE THEREOF

(71) Applicant: Samsung Electronics Co., Ltd., Suwon-si, Gyeonggi-do (KR)

(72) Inventors: Hae-Sun Lee, Suwon-si (KR); Jong-Hyub Lee, Suwon-si (KR); Moon-Soo Kim, Seoul (KR); Jong-Keun Shin, Yongin-si (KR); Joo-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 14/626,156

(22) Filed: Feb. 19, 2015

(65) Prior Publication Data

US 2015/0244923 A1  Aug. 27, 2015

(30) Foreign Application Priority Data

Feb. 21, 2014  (KR) ........................ 10-2014-0020868

(51) Int. Cl.
*H04N 9/04* (2006.01)
*H04N 5/355* (2011.01)

(52) U.S. Cl.
CPC ......... *H04N 9/045* (2013.01); *H04N 5/35554* (2013.01)

(58) Field of Classification Search
CPC ...... H04N 9/045; H04N 5/235; H04N 5/2351; H04N 5/2352; H04N 5/2353; H04N 5/2355; H04N 5/351; H04N 5/353; H04N 5/3535; H04N 5/355; H04N 5/35536; H04N 5/35545; H04N 5/35554
See application file for complete search history.

(56) References Cited

U.S. PATENT DOCUMENTS

| | | | |
|---|---|---|---|
| 2005/0057666 A1* | 3/2005 | Hu | H04N 5/2351 348/229.1 |
| 2007/0285547 A1* | 12/2007 | Milligan | H04N 3/155 348/308 |
| 2010/0020194 A1* | 1/2010 | Hirooka | H04N 5/23219 348/229.1 |
| 2011/0169980 A1 | 7/2011 | Cho et al. | |
| 2012/0113297 A1* | 5/2012 | Mori | H04N 5/23219 348/234 |
| 2013/0208138 A1* | 8/2013 | Li | H04N 5/2353 348/229.1 |
| 2014/0307117 A1* | 10/2014 | Feng | H04N 5/2351 348/218.1 |
| 2015/0009355 A1* | 1/2015 | Peng | H04N 5/2355 348/222.1 |
| 2015/0054992 A1* | 2/2015 | Luo | H04N 5/35563 348/262 |

(Continued)

*Primary Examiner* — Timothy J Henn
(74) *Attorney, Agent, or Firm* — Jefferson IP Law, LLP

(57) ABSTRACT

An apparatus and a method for acquiring an image in an electronic device are provided. The method includes acquiring a first image using an image sensor that comprises a plurality of first pixels having a first exposure and a plurality of second pixels having a second exposure, determining a reference exposure value based on image information, adjusting at least one of the first exposure or the second exposure based on the reference exposure value, and acquiring a second image using the image sensor based on exposure control.

16 Claims, 24 Drawing Sheets

(56) References Cited

U.S. PATENT DOCUMENTS

| | | | |
|---|---|---|---|
| 2015/0070570 A1* | 3/2015 | Tajbakhsh | H04N 9/735 348/362 |
| 2015/0181102 A1* | 6/2015 | Oda | H04N 5/2355 348/229.1 |
| 2015/0244916 A1* | 8/2015 | Kang | H04N 5/2355 348/222.1 |
| 2015/0271405 A1* | 9/2015 | Lameer | H04N 5/23222 348/222.1 |

* cited by examiner

METHOD FOR ACQUIRING IMAGE AND ELECTRONIC DEVICE THEREOF

CROSS-REFERENCE TO RELATED APPLICATION(S)

This application claims the benefit under 35 U.S.C. §119(a) of a Korean patent application filed on Feb. 21, 2014 in the Korean Intellectual Property Office and assigned Serial number 10-2014-0020868, the entire disclosure of which is hereby incorporated by reference.

TECHNICAL FIELD

The present disclosure relates to an electronic device. More particularly, the present disclosure relates to an apparatus and a method for acquiring an image using an image sensor in an electronic device.

BACKGROUND

As information communication technology and semiconductor technology advance, various electronic devices have developed into multimedia devices for providing diverse multimedia services. For example, a portable electronic device may provide various multimedia services such as broadcasting service, wireless Internet service, camera service, and audio play service.

The electronic device requires a solution for enhancing quality of an image acquired by an image sensor.

The electronic device may enhance the corresponding image quality by adjusting a dynamic range which represents luminance from a dark area to a light area of the image acquired by the image sensor. For example, the electronic device may enhance the image quality by capturing an image using the image sensor and combining two or more images of different exposures with respect to the same object.

However, it is difficult for the electronic device to adjust the dynamic range of the image in real time or to capture a video of the improved quality due to the time delay caused when capturing and combining a plurality of images for the sake of the image quality improvement.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for acquiring an image of an adjusted dynamic range using an image sensor in an electronic device.

Another aspect of the present disclosure is to provide an apparatus and a method for acquiring a High Dynamic Range (HDR) image using an image sensor including at least two pixels of different exposures in an electronic device.

Yet another aspect of the present disclosure is to provide an apparatus and a method for controlling exposure of pixels of an image sensor in an electronic device.

Still another aspect of the present disclosure is to provide an apparatus and a method for controlling exposure of pixels used to adjust a dynamic range of an image based on a reference exposure value determined according to a luminance value of at least part of image information acquired by an image sensor in an electronic device.

A further aspect of the present disclosure is to provide an apparatus and a method for dynamically determining an exposure control value of one or more pixels based on a ratio or the number of pixels (e.g., saturated pixels) exceeding or falling below a preset exposure value in an electronic device.

In accordance with an aspect of the present disclosure, a method for acquiring an image in an electronic device is provided. The method includes acquiring a first image using an image sensor that comprises a plurality of first pixels having a first exposure and a plurality of second pixels having a second exposure, determining a reference exposure value based on image information, adjusting at least one of the first exposure or the second exposure based on the reference exposure value, and acquiring a second image using the image sensor based on exposure control.

In accordance with another aspect of the present disclosure, an electronic device is provided. The electronic device includes an image sensor comprising an array of pixels configured to acquire image data from the array of the pixels and at least one processor configured to process the image data. The array of the pixels comprises a plurality of first pixels having a first exposure and a plurality of second pixels having a second exposure. The processor is configured to acquire a first image using the image sensor, to determine a reference exposure value based on image information, to adjust at least one of the first exposure or the second exposure based on the reference exposure value, and to acquire a second image using the image sensor based on exposure control.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
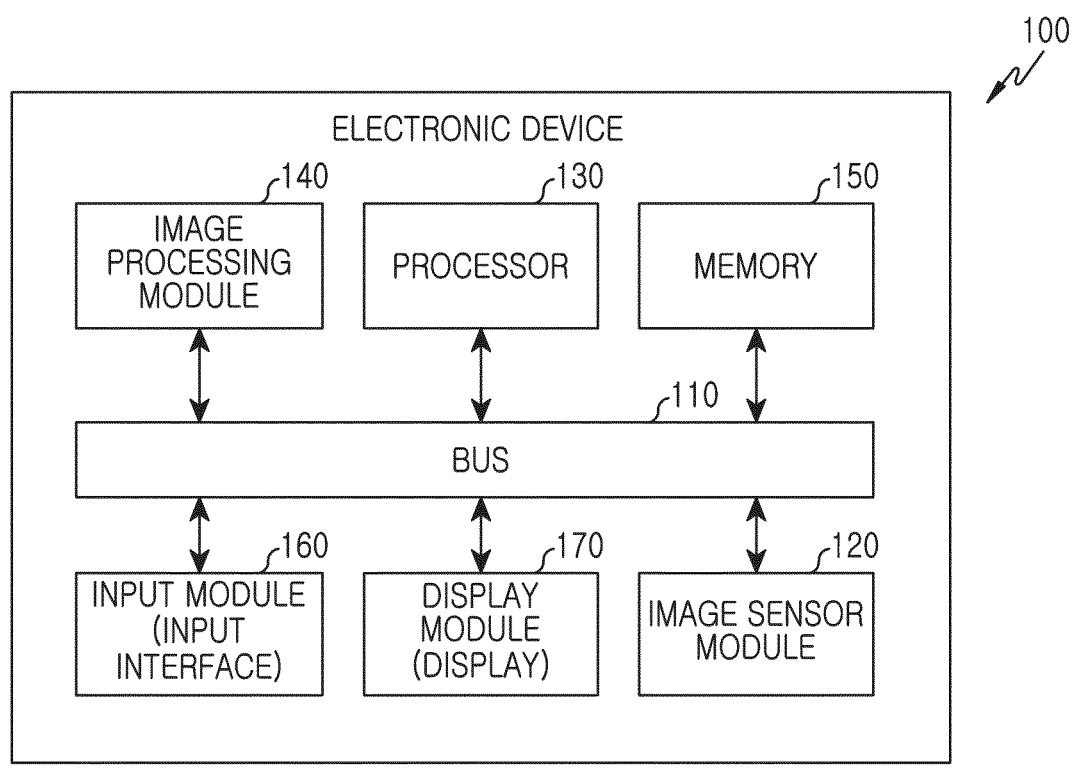
FIG. 1 illustrates an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms used herein are merely used to describe specific embodiments, and are not intended to limit the present disclosure. The terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Although terms including ordinal numbers, such as "first" and "second," and the like, may be used to describe various components, such components are not limited by the above terms. The above terms are used only to distinguish one component from another. For example, a first component may be referred to as a second component without departing from the scope of the present disclosure, and likewise a second component may be referred to as a first component. The term of "and/or" encompasses a combination of plural items or any one of the plural items.

In the case according to which a component is referred to as being "connected" or "accessed" to other component, it should be understood that not only the component is directly connected or accessed to the other component, but also there may exist another component between them. Meanwhile, in the case according to which a component is referred to as being "directly connected" or "directly accessed" to other component, it should be understood that there is no component there between.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure may be a device including a camera function. For example, the electronic device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), an digital audio player, a mobile medical appliance, a camera, or a wearable device (e.g., head-mounted-device (HMD) such as electronic glasses, electronic textiles, electronic bracelet, electronic necklace, electronic appcessory, electronic tattoo, or smart watch).

The electronic device may be a smart home appliance having the camera function. The smart home appliance, for example, may include at least one of a television (TV), a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), game consoles, an electronic dictionary, a digital key, a camcorder, or a digital frame.

The electronic device may include at least one of various medical appliances (e.g., Magnetic Resonance Angiography (MRA), Magnetic Resonance Imaging (MRI), Computed Tomography (CT), X-ray, ultrasonicator), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), avionics, a security device, or an industrial or home robot.

The electronic device may include at least one of furniture or part of building/structure having the camera function, an electronic board, an electronic signature receiving device, a projector, or various gauges (e.g., gauges for water, electricity, or radio wave). The electronic device may be one or a combination of those various devices. Those skilled in the art shall understand that the electronic device is not limited those devices.

Hereinafter, the electronic device according to various embodiments of the present disclosure is described in reference to the attached drawings. The term 'user' used herein may indicate a person or a device (e.g., an artificial intelligence electronic device) who or which uses the electronic device.

Various embodiments of the present disclosure provide a technique for adjusting a dynamic range of an image acquired by an image sensor using at least two pixels of different exposures in an electronic device.

FIG. 1 is a block diagram of an electronic device according to an embodiment of the present disclosure. Hereafter, an image sensor module 120 is explained based on image detection pixels of FIGS. 4A and 4B.

Referring to FIG. 1, the electronic device 100 may include a bus 110, the image sensor module 120, a processor 130, an image processing module 140, a memory 150, an input module (input interface) 160, and a display module (display) 170. One or more of the processor 130 and the memory 150 may be provided by a plurality of processors 130 and memories 150.

The bus 110 may interconnect the components of the electronic device 100 and control communication between the components of the electronic device 100.

The image sensor module 120 may capture an object and provide image data to at least one of the processor 130 or the image processing module 140. For example, the image sensor module 120 may include a plurality of pixels for providing different exposures. For example, the pixels may create a plurality of pixel groups divided based on the exposure.

Figure 4A:
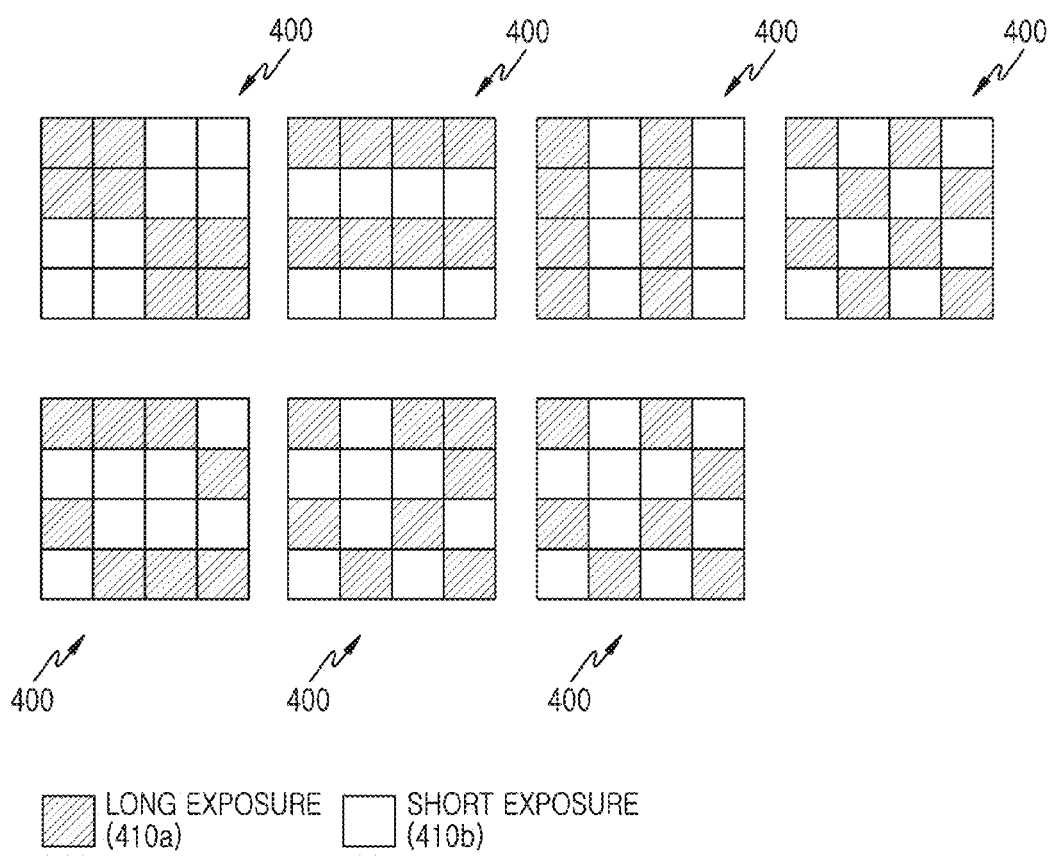
FIGS. 4A and 4B illustrate image detection pixels arranged in an image sensor module according to various embodiments of the present disclosure.
Figure 4B:
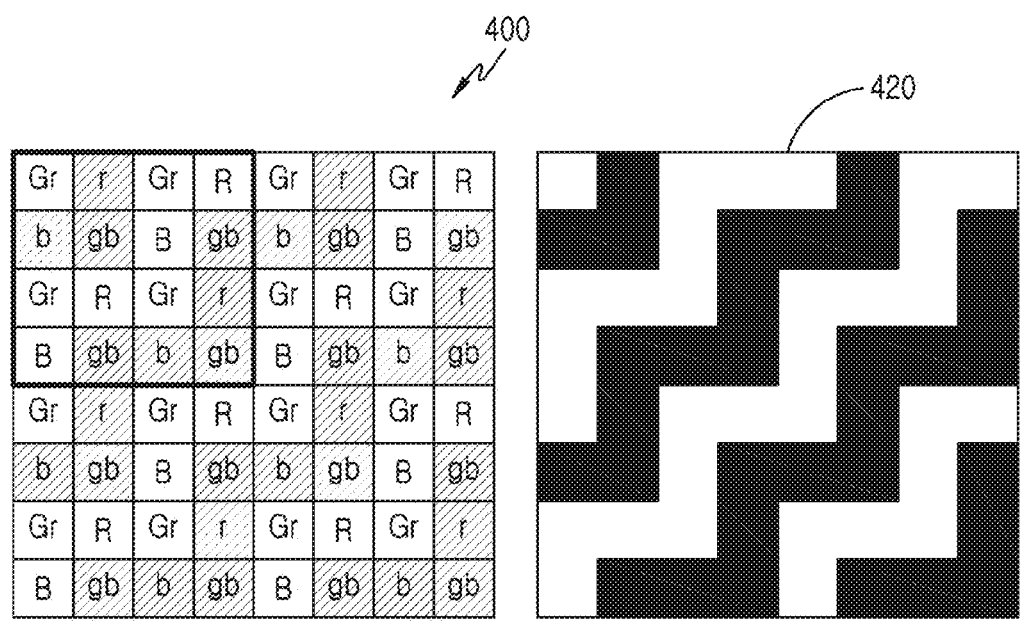

FIGS. 4A and 4B illustrate image detection pixels arranged in an image sensor module according to various embodiments of the present disclosure.

Referring to FIG. 4A, pixels 400 of the image sensor module 120 may include at least one Long Exposure Pixel (LEP) 410a of a first pixel group having the exposure greater than or equal to the other pixels, and at least one Short Exposure Pixel (SEP) 410b of a second pixel group having the exposure smaller than or equal to the other pixels, in a repetitive pattern or in an irregular pattern.

The image sensor module 120 may dynamically arrange the LEP 410a and the SEP 410b. For example, color pixels 400 of the image sensor module 120 may designate gray pixels 412b to the SEPs and designate other color pixels 412a excluding the gray pixels 412b to the LEPs as shown in FIG. 4B. Hence, the color pixels 400 of the image sensor module 120 may arrange the LEPs 412a and the SEPs 412b in a zigzag pattern 420.

The image sensor module 120 may include an additional pixel group for acquiring the exposure smaller than the LEP 410a or 412a and greater than the SEP 410b or 412b.

The exposure of the pixel may be determined by, for example, an exposure time, a photoelectric conversion efficiency (or sensitivity) of the pixel, a pixel size, a lens aperture, and a color filter. For example, the pixels of the image sensor module 120 may include pixels of a light receiving efficiency higher or lower than the other pixels in structure or in function. For example, when the same exposure time is given, the pixel of the low light receiving efficiency may receive less light per unit time according to the structure or under the control of the processor 130 or the image processing module 140. For example, to obtain more image information, the pixel of the low light receiving efficiency may use a longer exposure time than the other pixels. The electronic device 100 may control the exposure time of the pixel of the image sensor module 120 regardless of the characteristics of the pixel.

The image sensor module 120 may include at least one sensor module functionally connected to the electronic device 100.

The processor 130 may control the electronic device 100 to provide various services. For example, the processor 130 may interpret an instruction received from one or more other components (e.g., the image sensor module 120, the image processing module 140, the memory 150, the input module 160, and the display module 170) of the electronic device 100 via the bus 110, and perform an operation or a data processing according to the interpreted instruction.

The processor 130 may control the electronic device 100 to provide various services by running one or more programs stored in the memory 150.

The image processing module 140 may obtain one image (e.g., a High Dynamic Range (HDR) image) by combining the image information acquired by at least one SEP and at least one LEP of the image sensor module 120. For example, the image processing module 140 may obtain one image (e.g., one HDR image) by interpolating first image information acquired by at least one SEP and second image information acquired by at least one LEP. For example, the image processing module 140 may correct at least part of a relatively bright area due to overexposure, using the first image information of at least one SEP. The image processing module 140 may correct at least part of a relatively dark area due to underexposure, using the second image information of at least one LEP. The relatively bright area due to the overexposure or the relatively dark area due to underexposure may be compensated by, for example, controlling the exposure of the area into a preset range.

The image processing module 140 may control the exposure (e.g., the exposure time) of the pixel of at least one of the pixel groups of the image sensor module 120. For example, the image processing module 140 may set a reference exposure value using brightness distribution of at least part of the image acquired by the imager sensor module 120. Based on the reference exposure value, the image processing module 140 may determine the exposure (e.g., the exposure time) of the first pixel group including at least one LEP and the second pixel group including at least one SEP. For example, the image processing module 140 may determine a temporary exposure for the pixels of the first or second pixel group so that the brightness distribution of at least part of the image satisfies an exposure control condition. The temporary exposure (e.g., the temporary exposure time) is used to determine the pixel exposure based on the reference exposure value. For example, since the pixel exposure may be determined by the pixel exposure time, determining the pixel exposure may include determining the pixel exposure time.

When the temporary exposure of the pixel of at least one of the first pixel group or the second pixel group is in a reference range determined based on the reference exposure value, the image processing module 140 may determine the exposure of the corresponding group as the temporary exposure. When the temporary exposure of the pixel of at least one of the first pixel group or the second pixel group is outside the reference range determined based on the reference exposure value, the image processing module 140 may determine the exposure of the reference range defined by the reference exposure value, as the exposure of the corresponding group. The image processing module 140 may set the reference exposure value using at least one of a weight corresponding to a location of the electronic device 100, a back light level, a color, or a face detection auto exposure, in addition to the brightness distribution of at least part of the image. For example, the image processing module 140 may set the reference exposure value by giving a weight for determining the reference exposure value to at least part of the recognized face area based on the brightness distribution of at least part of the image. For example, the image processing module 140 may set the reference exposure value by giving a weight corresponding to back light information based on the brightness distribution of at least part of the image.

The image processing module 140 may dynamically set an exposure control value for controlling the pixel exposure based on a ratio or the number of the pixels (e.g., saturated pixels) having the exposure exceeding a preset value. For example, when controlling the exposure (e.g., the exposure time) of the pixels of the first or second pixel group based on the brightness value of the image acquired by the image sensor module 120, the image processing module 140 may dynamically set the exposure control value for controlling the pixel exposure. For example, the image processing module 140 may determine the exposure control value corresponding to the saturated pixel ratio using a table of the exposure control values corresponding to the saturated pixel rate. For example, the image processing module 140 may determine the exposure control value corresponding to the saturated pixel ratio using an equation for calculating a preset exposure control value. For example, the image processing module 140 may increase the exposure control value as the saturated pixel rate rises.

The exposure control value for controlling the pixel exposure may be calculated based on the ratio or the number of pixels (e.g., underexposed pixels) having the exposure lower than the preset value.

The image processing module 140 may dynamically control an image processing function based on a camera mode of the electronic device 100. For example, when the electronic device 100 is in an auto exposure mode, the image processing module 140 may limit at least one of a reconstruction function or a dynamic range compress function for the image acquired by the image sensor module 120. For example, when the electronic device 100 is in an HDR mode, the image processing module 140 may control to execute at least one of the reconstruction function or the dynamic range compress function for the image acquired by the image sensor module 120. In so doing, the image processing module 140 may recognize the camera mode (e.g., the auto exposure mode or the HDR mode) of the electronic device 100 using the image information provided from the first pixel group or the second pixel group of the image sensor module 120.

The electronic device 100 may variously control the dynamic range according an image pickup environment or an object.

The electronic device 100 may calculate a plurality of values for controlling the overexposed pixel or the underexposed pixel to an appropriate exposure. For example, the electronic device 100 may determine one of these values as the reference exposure value. For example, the electronic device 100 may determine the value calculated using at least some of these values, as the reference exposure value.

When the object is over a certain distance away from the image sensor module 120 but within a shooting range (e.g., an angle of view) of the image sensor module 120, the electronic device 100 may calculate the value for adjusting the overexposed pixel to an appropriate exposure and determine the calculated value as the reference exposure value.

When the object is away from the image sensor module 120 in the certain distance within the shooting range (e.g., the angle of view) of the image sensor module 120, the electronic device 100 may calculate the value for capturing the object with an appropriate exposure and determine the calculated value as the reference exposure value.

The memory 150 may store an instruction or data received from or generated by one or more components (e.g., the image sensor module 120, the processor 130, the image processing module 140, the input module 160, and the display module 170) of the electronic device 100.

The memory 150 may store one or more programs executed by at least one of the processor 130 or the image processing module 140 for the service of the electronic device 100.

The input module (input interface) 160 may send an instruction or data generated by a user's selection, to at least one of the processor 130, the image processing module 140, or the memory 150 via the bus 110. For example, the input module 160 may include one or more of a keypad including at least one hardware button or a touch sensor for detecting touch information.

The display module 170 may display data such as still picture, moving picture, or text. For example, the display module 170 may display an application program driven by the processor 130. For example, the display module 170 may display the image captured by the image sensor module 120 and processed by the image processing module 140.

The electronic device 100 may further include a communication module (communication interface), which is not shown, for connecting the communication between at least one other electronic device, a server, or at least one peripheral and the electronic device 100. For example, the communication module (communication interface) may communicate with an external device by accessing a network using wireless communication or wired communication. The wireless communication may include at least one of, for example, Wireless Fidelity (Wifi), Bluetooth, Near Field Communication (NFC), satellite communication (e.g., GPS), and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM)). The wired communication may include at least one of, for example, Universal Serial Bus (USB), High Definition Multimedia Interface (HDMI), Recommended Standard (RS) 232, or Plain Old Telephone Service (POTS).

The network may be a telecommunications network. The telecommunications network may include at least one of a computer network, Internet, Internet of things, or a telephone network. A communication protocol (e.g., transport layer protocol, data link layer protocol, or physical layer protocol) between the electronic device 100 and the external device may be supported by at least one of an application, an application programming interface, a middleware, a kernel, or the communication module (communication interface).

The other electronic device, which is a peripheral of the electronic device 100, may include a device of the same or different type as or from the electronic device 100.

While the image sensor module 120 is included in the electronic device 100, the image sensor module 120 outside the electronic device 100 may be wired or wirelessly connected to the electronic device 100 through various interfaces.

The image processing module 140 may control the image acquisition in one module and the exposure of the pixels for the image acquisition. For example, at least some of the functions of the image processing module 140 may be conducted by the processor 130 or the image sensor module 120. The image processing module 140 may include separate hardware, software, or firmware modules, or their combination, for controlling the image acquisition and the exposure of the pixels for the image acquisition.

Figure 2:
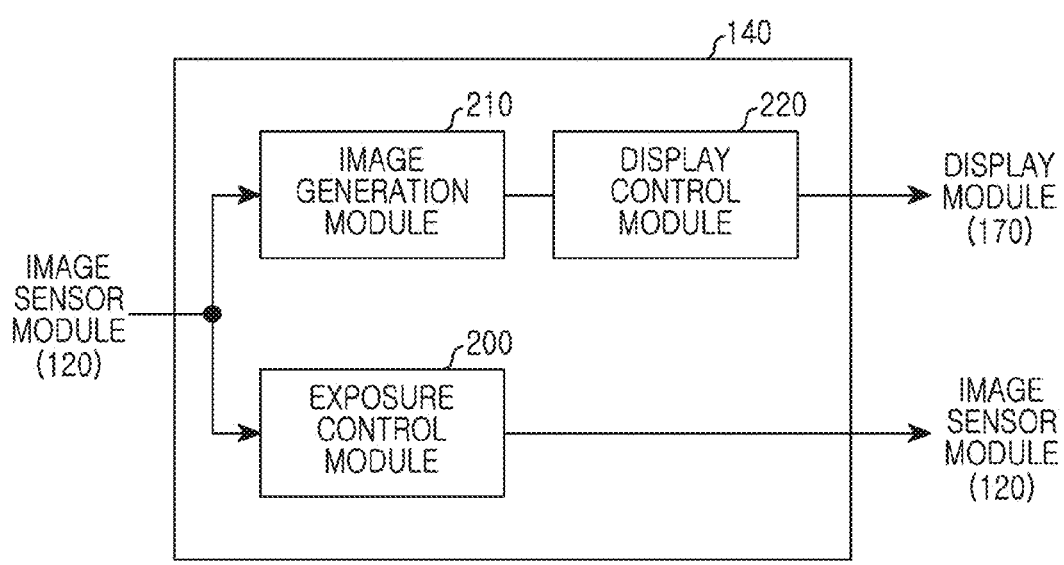
FIG. 2 illustrates an image processing module according to an embodiment of the present disclosure.

FIG. 2 is a detailed block diagram of the image processing module according to an embodiment of the present disclosure.

Referring to FIG. 2, the image processing module 140 may include an exposure control module 200 and an image generation module 210. Each module may include hardware, software, or firmware, alone or in combination. For example, when the module is implemented using the software, one or more processors (e.g., an image processor, an application processor, or their combination) may functionally provide the module.

The exposure control module 200 may control the exposure (e.g., the exposure time) of the pixels of at least one of the pixel groups of the image sensor module 120. For example, the exposure control module 200 may set the reference exposure value using the brightness distribution of at least part of the image acquired by the imager sensor module 120. Based on the reference exposure value, the exposure control module 200 may determine the exposure (e.g., the exposure time) of the first pixel group including at least one LEP and the second pixel group including at least one SEP. The exposure control module 200 may set the reference exposure value using at least one of the weight corresponding to the location of the electronic device 100, the back light level, the color, or the face detection auto exposure, in addition to the brightness distribution of at least part of the image.

The exposure control module 200 may dynamically set the exposure control value for controlling the pixel exposure based on the ratio or the number of the pixels (e.g., the saturated pixels) having the exposure exceeding the preset value. For example, when controlling the exposure (e.g., the exposure time) of each pixel of the first or second pixel group based on the brightness value of the image acquired by the image sensor module 120, the exposure control module 200 may dynamically set the exposure control value for controlling the pixel exposure. For example, the exposure control module 200 may increase the exposure control value as the saturated pixel rate rises.

The image generation module 210 may obtain one image (e.g., one HDR image) by combining the image information acquired by at least one SEP or at least one LEP of the image sensor module 120. For example, the image generation module 210 may obtain one image (e.g., one HDR image) by interpolating the first image information acquired by at least one SEP and the second image information acquired by at least one LEP.

The image generation module 210 may dynamically control the image processing function based on the camera mode of the electronic device 100. For example, based on the camera mode of the electronic device 100, the image generation module 210 may dynamically limit at least one of the reconstruction function or the dynamic range compress function for the image acquired by the image sensor module 120.

The image processing module 140 may further include a display control module 220 for controlling to provide a graphical user interface. For example, the display control module 220 may control the display module 170 to display the image (e.g., the HDR image), which is generated by the image generation module 210, of the adjusted dynamic range.

As such, the electronic device 100 may control the image acquisition and the pixel exposure for the image acquisition using the processor 130 and the separate image processing module 140.

Alternatively, the electronic device 100 may control the image acquisition and the pixel exposure for the image acquisition using the processor 130.

Figure 3:
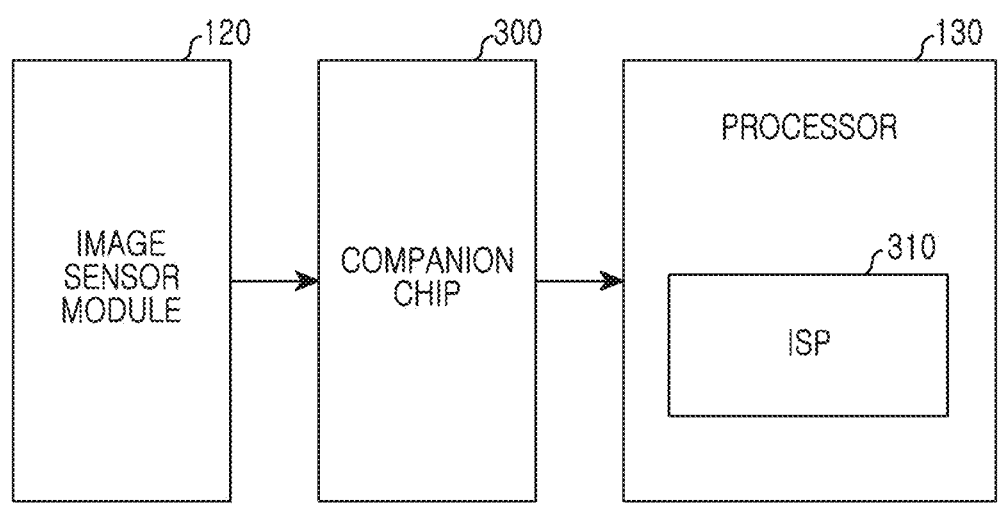
FIG. 3 illustrates the electronic device in detail according to an embodiment of the present disclosure.

FIG. 3 is a detailed block diagram of the electronic device according to an embodiment of the present disclosure.

Referring to FIG. 3, the electronic device 100 may include an image sensor module 120, a companion chip 300, and a processor (e.g., an application processor) 130.

The image sensor module 120 may acquire the image by capturing the object. For example, the image sensor module 120 may include pixels divided into at least two groups of different exposures for the dynamic range correction.

The companion chip 300 may perform a first image processing on the image information (e.g., raw data) fed from the image sensor module 120. For example, the companion chip 300 may process at least one of Bad Pixel Correction (BPC), Reconstruction (Recon), and Dynamic Range Compression (DRC) with respect to the image information fed from the image sensor module 120. For example, the companion chip 300 may combine the first image information acquired by at least one SEP and the second image information acquired by at least one LEP into one image using the Recon.

The processor 130 may include an Image Signal Processor (ISP) 130 for controlling the image acquisition and the exposure control for the image acquisition.

The ISP 310 may determine the exposure (e.g., the exposure time) of the pixels of at least one of the pixel groups of the image sensor module 120. For example, the ISP 310 may set the reference exposure value using the brightness distribution of at least part of the image acquired by the imager sensor module 120. Based on the reference exposure value, the ISP 310 may determine the exposures (e.g., the exposure times) of the first pixel group including at least one LEP and the second pixel group including at least one SEP. The ISP 310 may set the reference exposure value using at least one of the weight corresponding to the location of the electronic device 100, the back light level, the color, or the face detection auto exposure, in addition to the brightness distribution of at least part of the image.

The ISP 310 may dynamically set the exposure control value for controlling the pixel exposure based on the ratio or the number of the pixels (e.g., the saturated pixels) having the exposure exceeding the preset value. For example, when controlling the exposure (e.g., the exposure time) of each pixel of the first or second pixel group based on the brightness distribution of at least part of the image acquired by the image sensor module 120, the ISP 310 may dynamically set the exposure control value for controlling the pixel exposure. For example, the ISP 310 may increase the exposure control value as the saturated pixel rate rises.

The ISP 310 may process the image fed from the companion chip 300. For example, the ISP 310 may conduct other image processing excluding the first image processing of the companion chip 300.

The ISP 310 may dynamically control the image processing function of the companion chip 300 based on the camera mode of the electronic device 100. For example, based on the camera mode of the electronic device 100, the ISP 310 may limit at least one of the reconstruction function and the dynamic range compress function of the companion chip 300 for the image acquired by the image sensor module 120.

An electronic device includes an image sensor comprising an array of pixels and acquiring image data from the array of the pixels, and at least one processor for processing the image data. The array of the pixels may include a plurality of first pixels having a first exposure and a plurality of second pixels having a second exposure. The processor may acquire a first image using the image sensor, determine a reference exposure value based on the image information, adjust at least one of the first exposure or the second exposure based on the reference exposure value, and acquire a second image using the image sensor based on the exposure control.

The processor may acquire a third image using the first pixels based on the exposure control, simultaneously acquire a fourth image using the second pixels, and acquire the second image by combining the third image and the fourth image.

The first exposure and the second exposure may include an exposure time for the first pixels and the second pixels respectively.

The second exposure may be greater than or equal to the first exposure.

The first pixels may include at least one SEP, and the second pixels may include at least one LEP.

The processor may determine the reference exposure value further using at least one of a weight corresponding to a location of the electronic device, a back light level, a color, or a face detection auto exposure, based on a brightness value of the first image.

The processor may compare a reference range covering the reference exposure value with the first exposure and the second exposure, and adjust at least one, outside the reference value, of the first exposure and the second exposure.

The processor may adjust at least one, outside the reference value, of the first exposure and the second exposure with a maximum value of the reference range.

The processor may detect the first exposure and the second exposure based on the first image.

The processor may determine whether to adjust the exposure of the pixels of the image sensor based on a saturation level of pixels of the image sensor using the first image, and when determining not to adjust the exposure of the pixels of the image sensor, detect exposures of the first pixels and the second pixels at the first image acquisition, as the first exposure and the second exposure.

When determining to adjust the exposure of the pixels of the image sensor, the processor may identify a saturated pixel of the image sensor using the first image and adjust at least one of the first exposure or the second exposure based on a ratio or the number of saturated pixels.

The processor may determine an exposure control value of at least one of the first exposure or the second exposure using a weight corresponding to the ratio or the number of the saturated pixels.

The image sensor module 120 may include at least one LEP and at least one SEP of different exposures. For example, the LEP and the SEP may have different exposures by setting different exposure time lengths. For example, the LEP and the SEP may have different exposures by setting different photoelectric conversion efficiencies. For example, the LEP and the SEP may have different exposures by setting different apertures. For example, the LEP and the SEP may have different exposures by setting different pixel sizes. For example, the LEP and the SEP may have different exposures by controlling the amount of incident light to the pixel per unit time using the lens or the filter.

Figure 5A:
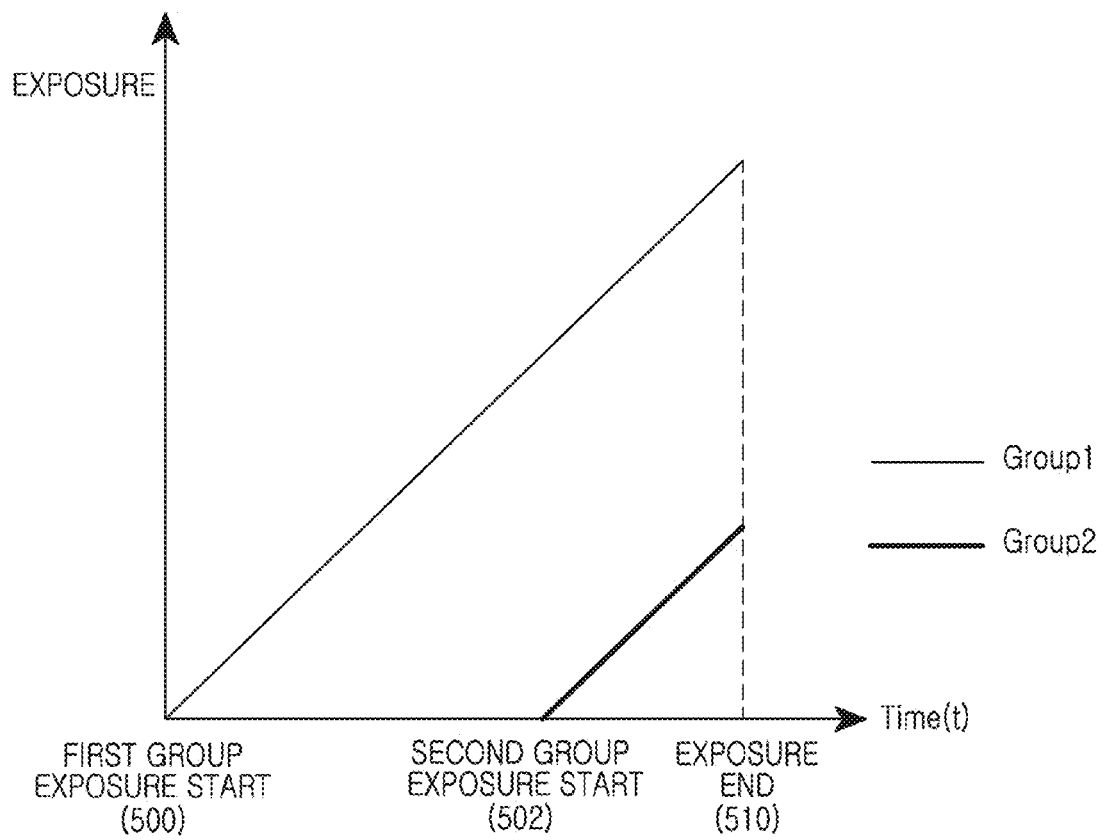
FIGS. 5A and 5B illustrate exposure of pixels in the image sensor module according to various embodiments of the present disclosure.
Figure 5B:
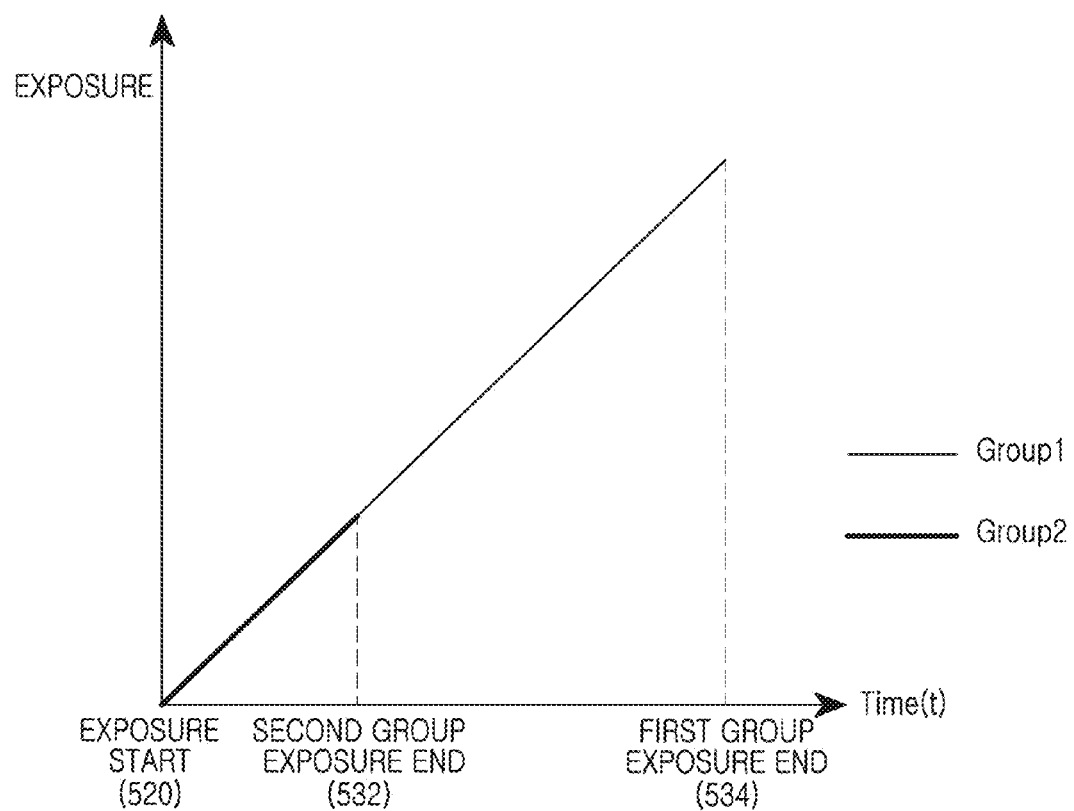

FIGS. 5A and 5B are graphs of the exposure of pixels in the image sensor module according to various embodiments of the present disclosure.

Referring to FIG. 5A, an exposure start time 502 of the second pixel group including at least one SEP is behind an exposure start time 500 of the first pixel group including at least one LEP, and the exposure of the first pixel group and the second pixel group ends at the same time 510. Thus, an electronic device (e.g., the electronic device 100) may control the LEP and the SEP to have the different exposures.

Referring to FIG. 5B, the first pixel group including at least one LEP and the second pixel group including at least one SEP commence the exposure at the same time 520, whereas an exposure end time 534 of the first pixel group is behind an exposure end time 532 of the second pixel group. Hence, the electronic device (e.g., the electronic device 100) may control the LEP and the SEP to have the different exposures.

Figure 6A:
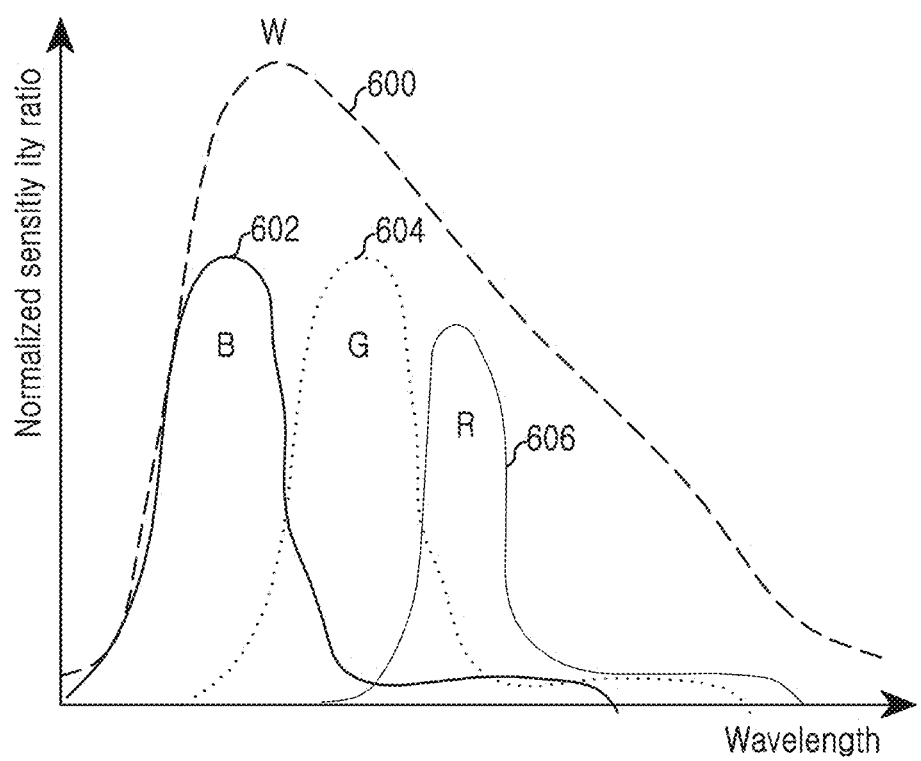
FIGS. 6A and 6B illustrate color filters arranged based on their characteristics in the image sensor module according to various embodiments of the present disclosure.
Figure 6B:
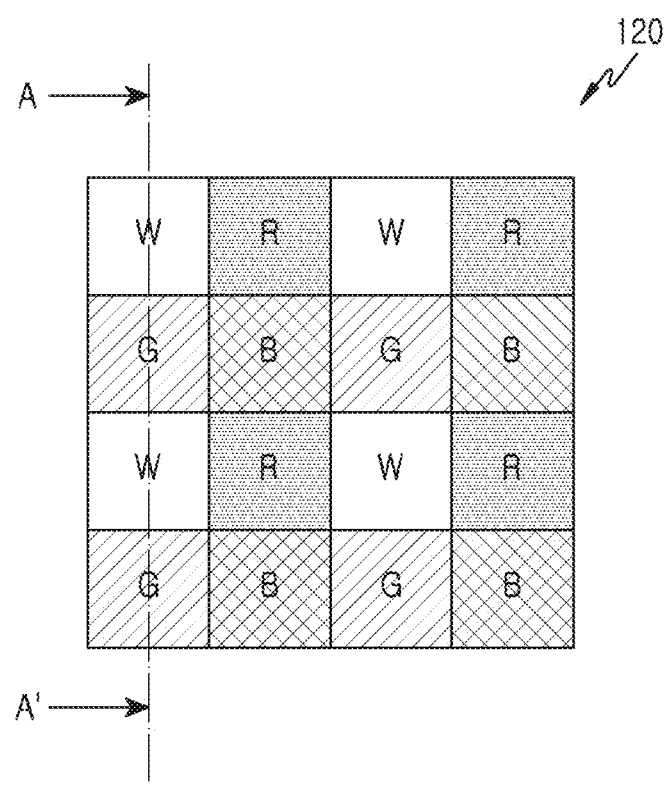

FIGS. 6A and 6B depict color filters arranged based on their characteristics in the image sensor module according to various embodiments of the present disclosure.

Referring to FIG. 6A, a white light (W) filter 600 may have a higher normalized sensitivity ratio than a red light (R) filter 602, a green light (G) filter 604, and a blue light (B) filter 606. The normalized sensitivity ratios of the R filter 602, the G filter 604, and the B filter 606 may be similar. Accordingly, the corresponding pixels in the W filter 600 may attain the higher normalized sensitivity ratio than the corresponding pixels of the other filter during the same exposure time. Thus, the electronic device (e.g., the electronic device 100) may construct the LEP and the SEP of the different exposures by arranging the filters of the different normalized sensitivity ratios in the pixels.

Figure 7A:
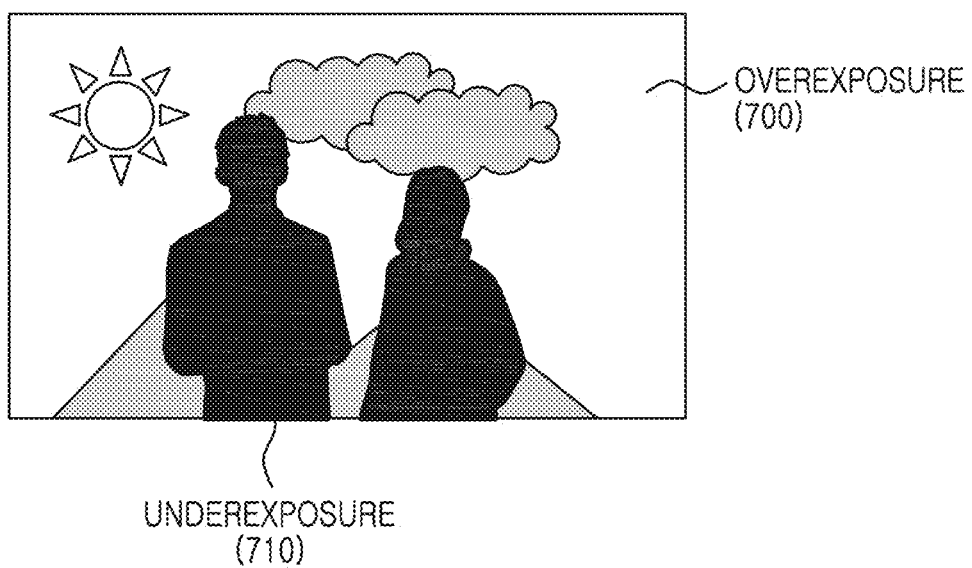
FIGS. 7A and 7B illustrate images acquired by adjusting a dynamic range in the electronic device according to various embodiments of the present disclosure.
Figure 7B:

FIGS. 7A and 7B depict images acquired by adjusting the dynamic range in the electronic device according to various embodiments of the present disclosure.

When capturing the object against the light, the electronic device 100 may display an underexposed object 710, relatively in front, darkly and an overexposed background 700 whitely as shown in FIG. 7A.

The electronic device 100 may obtain an image 720 of an appropriate exposure using first image information acquired using at least one LEP of the relatively great exposure and second image information acquired using at least one SEP of the relatively small exposure as shown in FIG. 7B. For example, the electronic device 100 may correct at least part of the relatively bright area overexposed, using the first image information acquired using at least one LEP. The electronic device 100 may correct at least part of the relatively dark area underexposed, using the second image information acquired using at least one SEP.

The electronic device 100 may obtain the image 720 of the appropriate exposure using at least part of the image information corresponding to the at least one LEP and at least part of the image information corresponding to the at least one SEP in the image information acquired by the image sensor module 120 as shown in FIG. 7B.

As such, when controlling the dynamic range of the image acquired by the image sensor module 120, the electronic device may compensate for the image exposure by analyzing a histogram of the image acquired by the image sensor module 120.

Figure 8A:
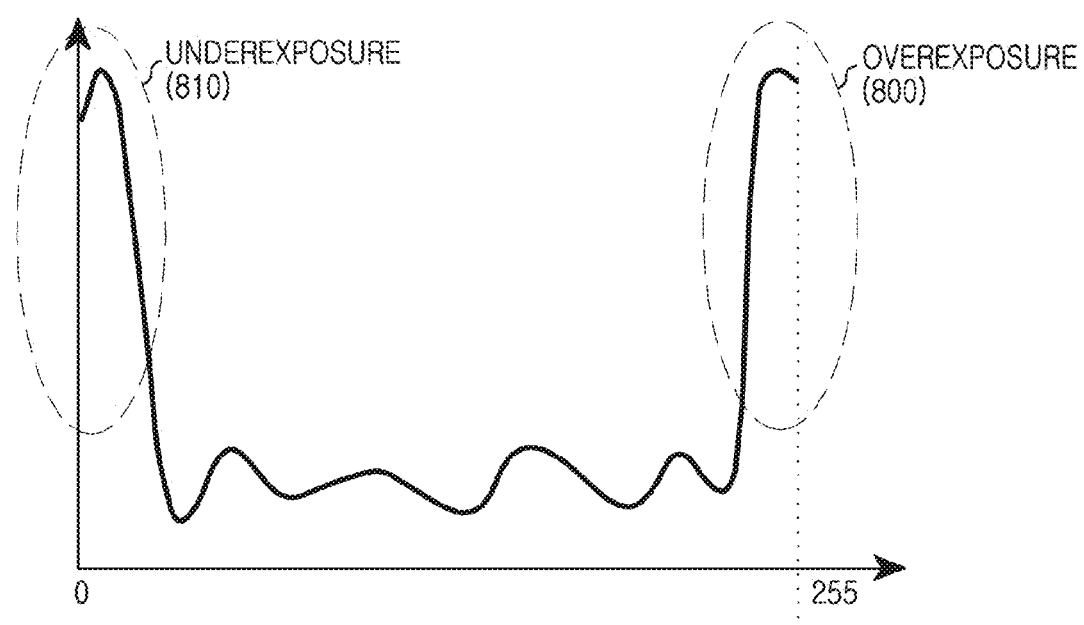
FIGS. 8A, 8B, and 8C illustrate histograms for adjusting the dynamic range according to various embodiments of the present disclosure.
Figure 8B:
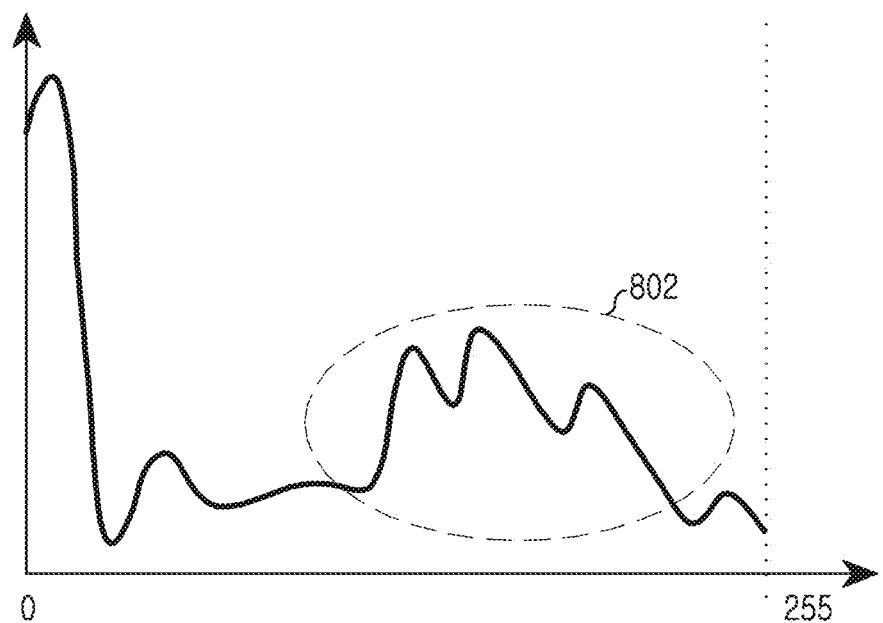
Figure 8C:
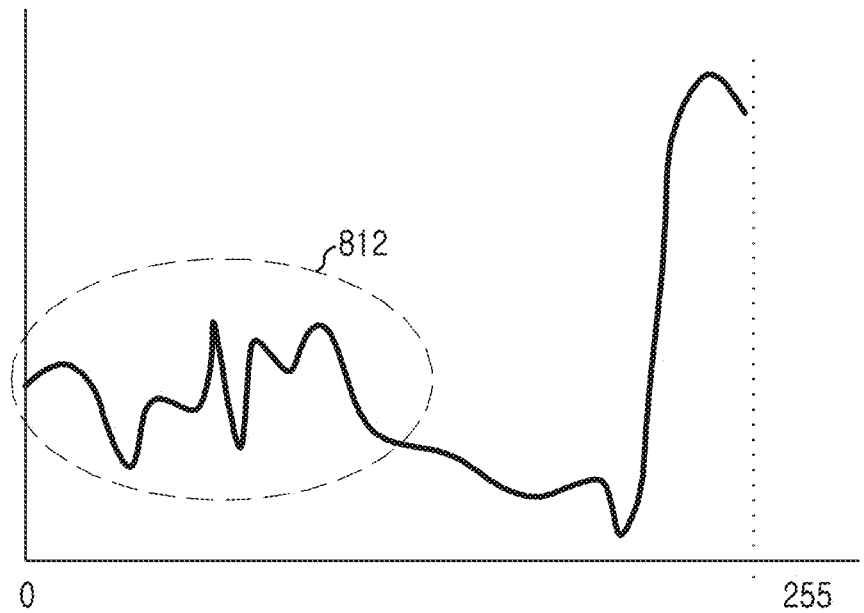

FIGS. 8A, 8B, and 8C depict histograms for adjusting the dynamic range according to various embodiments of the present disclosure.

Referring to FIG. 8A, the histogram of the image acquired in the Auto Exposure (AE) mode of the electronic device 100 may represent an overexposed area 800 and an underexposed area 810.

Referring to FIG. 8B, the electronic device 100 may make the exposure of at least one SEP of the image sensor module 120 of the overexposed area 800 shorter than the normal exposure and thus obtain an image 802 of the compensated overexposure.

Referring to FIG. 8C, the electronic device 100 may make the exposure of at least one LEP of the image sensor module 120 of the underexposed area 810 longer than the normal exposure and thus obtain an image 812 of the compensated underexposure.

Figure 9:
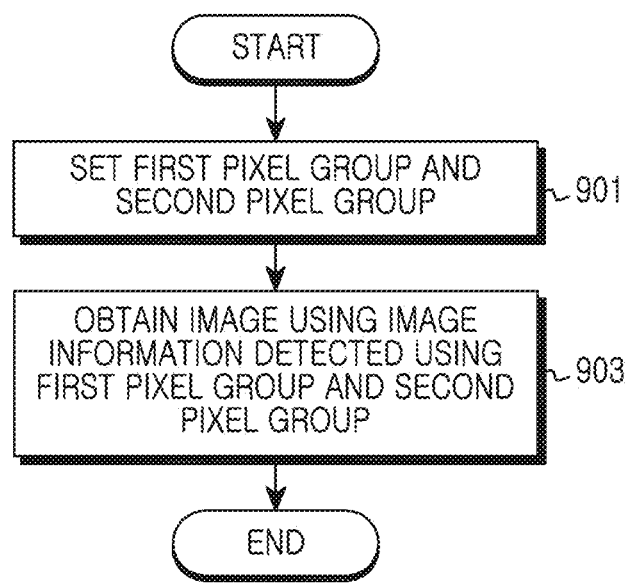
FIG. 9 illustrates a method for acquiring a High Dynamic Range (HDR) image in the electronic device according to an embodiment of the present disclosure.

FIG. 9 illustrates a method for acquiring the HDR image in the electronic device according to an embodiment of the present disclosure.

Referring to FIG. 9, the electronic device 100 may set the first pixel group including at least one LEP of the relatively great exposure and the second pixel group including at least one SEP of the relatively small exposure among the pixels of the image sensor module 120 in operation 901. For example, the electronic device 100 may set an area of interest in the image formed by the image sensor module 120. The electronic device 100 may relatively lengthen the exposure time of at least one LEP of the image sensor module 120 with respect to the area of interest.

In operation 903, the electronic device 100 may obtain one image (e.g., one HDR image) by combining the image information acquired by at least one pixel of the groups. For example, the electronic device 100 may obtain one image (e.g., one HDR image) by interpolating the first image information acquired by at least one SEP and the second image information acquired by at least one LEP.

Figure 10:
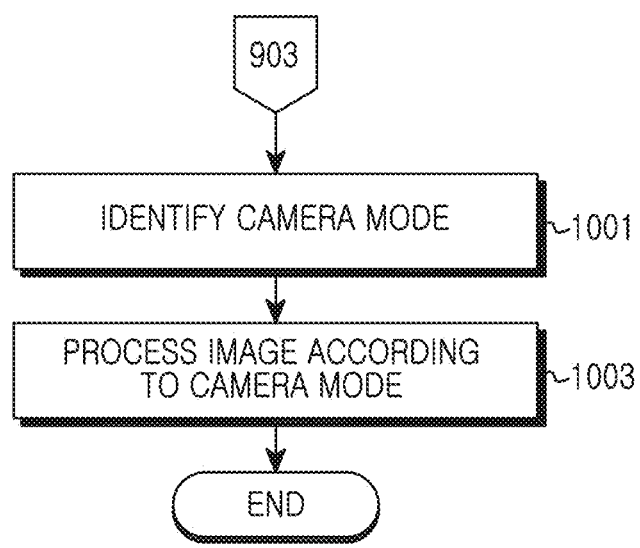
FIG. 10 illustrates a method for selectively processing the image based on a camera mode in the electronic device according to an embodiment of the present disclosure.

FIG. 10 illustrates a method for adjusting the exposure of the pixel based on the camera mode in the electronic device according to an embodiment of the present disclosure.

Referring to FIG. 10, after obtaining one image using the first image information acquired by at least one SEP or the second image information acquired by at least one LEP in operation 903 of FIG. 9, the electronic device 100 may identify its camera mode in operation 1001. For example, the electronic device 100 may determine whether it is in the AE mode or the HDR mode, using the first image information acquired by at least one SEP or the second image information acquired by at least one LEP.

In operation 1003, the electronic device 100 may dynamically control the image processing function based on the camera mode. For example, in the AE mode, the electronic device 100 may restrict at least one of the Recon function or the DRC function for the image. For example, in the HDR mode, the electronic device 100 may control to conduct at least one of the Recon function or the DRC function for the image.

In FIGS. 9 and 10, the electronic device 100 may obtain one image using the first image information and the second image information in operation 903 and then determine the image processing function based on the camera mode.

Alternatively, the electronic device 100 may determine the image processing function based on the camera mode, before obtaining one image using the first image information and the second image information in operation 903 of FIG. 9.

Figure 11:
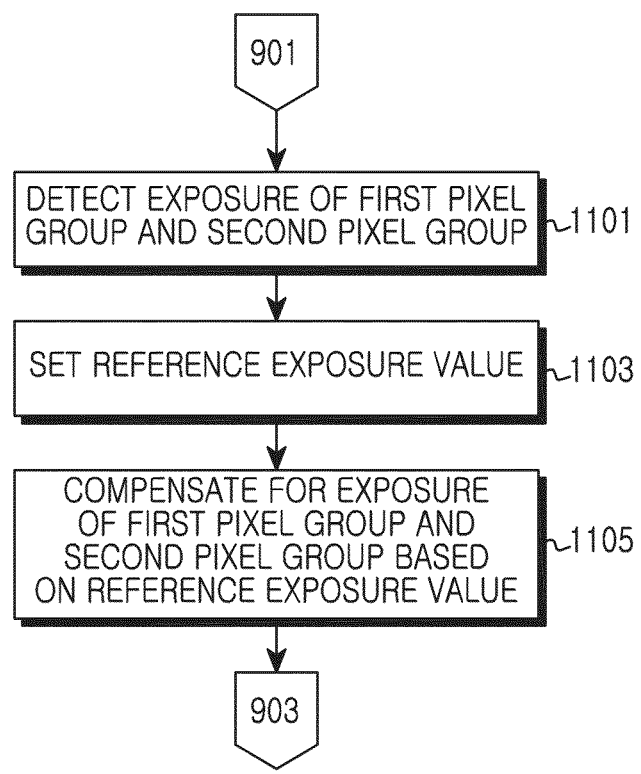
FIG. 11 illustrates a method for determining the exposure of the pixels based on a reference exposure value in the electronic device according to an embodiment of the present disclosure.

FIG. 11 illustrates a method for determining the exposure of the pixels based on the reference exposure value in the electronic device according to an embodiment of the present disclosure.

Referring to FIG. 11, after dividing the pixels of the image sensor module 120 to the at least two groups of the different exposures in operation 901 of FIG. 9, the electronic device 100 may detect the exposure of at least one pixel of the first pixel group or the second pixel group each in operation 1101. For example, the electronic device 100 may determine the temporary exposure (e.g., the exposure time) for the pixels of the first and second pixel groups so that the brightness distribution of at least part of the image acquired by the image sensor module 120 satisfies the exposure control condition. The electronic device 100 may determine the temporary exposure (e.g., the exposure time) for the pixels of the first and second pixel groups so that statistical data (e.g., an average brightness value) of the image information acquired by the image sensor module 120 satisfies the exposure control condition (e.g., the ratio of the pixels exceeding a preset exposure value). The temporary exposure may be used to determine the pixel exposure based on the reference exposure value.

In operation 1103, the electronic device 100 may set the reference exposure value using the brightness distribution of at least part of the image acquired by the imager sensor module 120. In so doing, the electronic device 100 may set the reference exposure value using the statistical data (e.g., the average brightness value) of the image information acquired by the image sensor module 120. Additionally or alternatively, the electronic device 100 may set the reference exposure value further using at least one of the weight corresponding to the location of the electronic device 100, the back light level, the color, or the face detection auto exposure.

In operation 1105, the electronic device 100 may determine the exposure (e.g., the exposure time) of at least one pixel of the first or second pixel group, based on the reference exposure value. For example, the electronic device 100 may compensate for the exposure (e.g., the exposure time), which is detected in operation 1101, of at least one pixel of the first or second pixel group based on the reference exposure value. For example, when the temporary exposure of the pixel of at least one of the first pixel group or the second pixel group is in the reference range determined based on the reference exposure value, the electronic device 100 may determine the exposure of the corresponding group as the temporary exposure in operation 1101. For example, when the temporary exposure in operation 1101 of the pixel of at least one of the first pixel group or the second pixel group is outside the reference range determined based on the reference exposure value, the electronic device 100 may determine a maximum exposure of the reference range defined by the reference exposure value, as the exposure of the corresponding group.

The electronic device 100 may obtain one image using the first image information acquired by at least one SEP and the second image information acquired by at least one LEP based on the exposures of the first pixel group and the second pixel group in operation 903 of FIG. 9.

FIGS. 12A, 12B, 12C, and 12D depict images captured based on the exposure of the pixels in the electronic device according to various embodiments of the present disclosure.

Figure 12A:
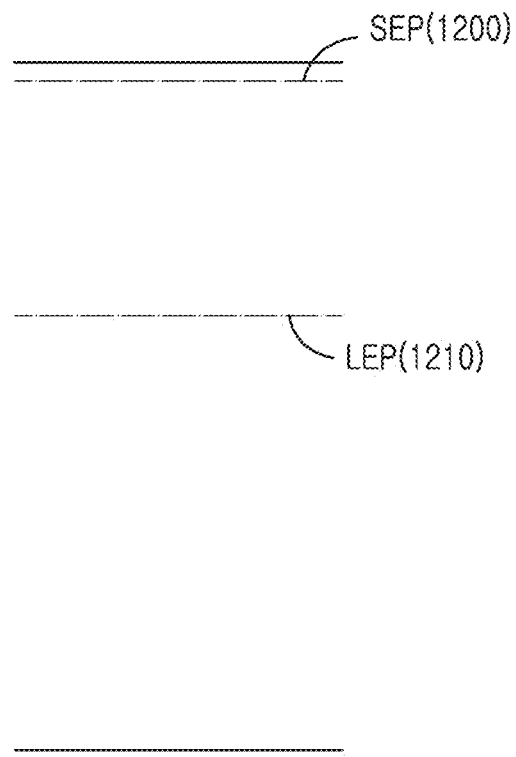
FIGS. 12A, 12B, 12C, and 12D illustrate images captured based on the exposure of the pixels in the electronic device according to various embodiments of the present disclosure.
Figure 12B:
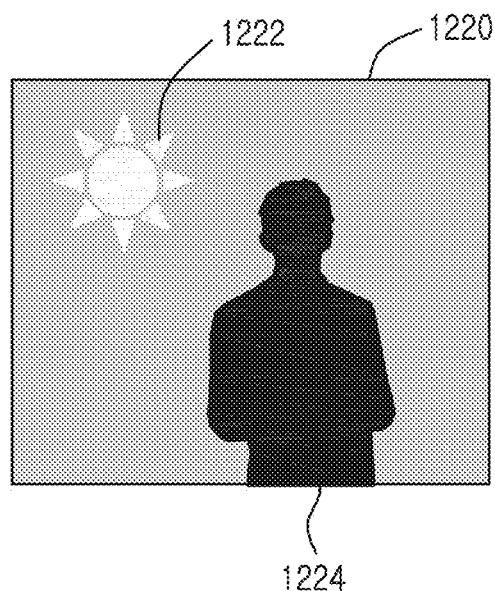

For example, when determining exposures (e.g., exposure times) 1200 and 1210 of pixels based on an SEP 1200 by analyzing the image histogram as shown in FIG. 12A, the electronic device 100 may obtain a first image 1220 including an unsaturated bright area 1222 and an underexposed dark area 1224 as shown in FIG. 12B. For example, provided that the appropriate exposure time of the SEP is $\frac{1}{128}$ second, the appropriate exposure time of the LEP is 1 second, and a maximum exposure scale of the long exposure and the short exposure is limited to 1:16, the electronic device 100 may determine the LEP exposure time as ⅛ second based on the SEP exposure time (e.g., ¹⁄₁₂₈ second). In this case, although the appropriate exposure time of the LEP is 1 second and the exposure time of the LEP is set to ⅛ second according to the maximum exposure scale, the electronic device 100 may obtain the first image 1220 which displays the underexposed dark area 1224.

Figure 12C:
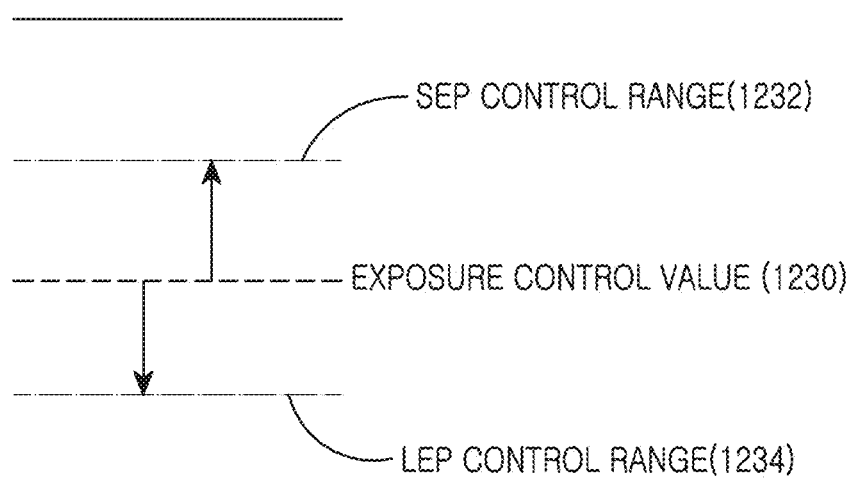
Figure 12D:
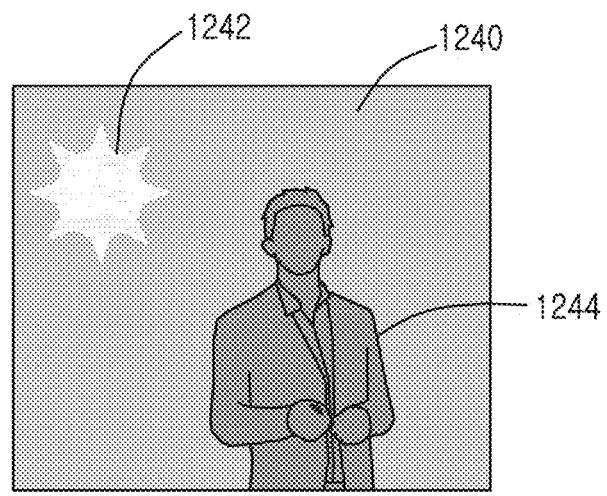

When the exposure (e.g., the exposure time) of the pixels is set based on a reference exposure value 1230 as shown in FIG. 12C, the electronic device 100 may obtain a second image 1240 where pixels of a bright area 1242 is more saturated than pixels of the bright area 1222 of FIG. 12B but pixels of an object (e.g., a dark area 1244) provides more appropriate exposure than the pixels of the dark area 1224 of FIG. 12B as shown in FIG. 12D. For example, when the exposure of the pixels is determined based on the reference exposure value 1230 and the temporary exposure 1200 or 1210 of the pixel of at least one of the first or second pixel groups is in the reference range 1232 and 1234 defined based on the reference exposure value 1230, the electronic device 100 may determine the exposure of the corresponding group as the temporary exposure in operation 1101. When the temporary exposure 1200 or 1210 of the pixel of at least one of the first or second pixel groups is outside the reference range 1232 and 1234 defined based on the reference exposure value 1230, the electronic device 100 may determine the maximum exposure 1232 or 1234 of the reference range defined by the reference exposure value, as the exposure of the corresponding group.

Figure 13:
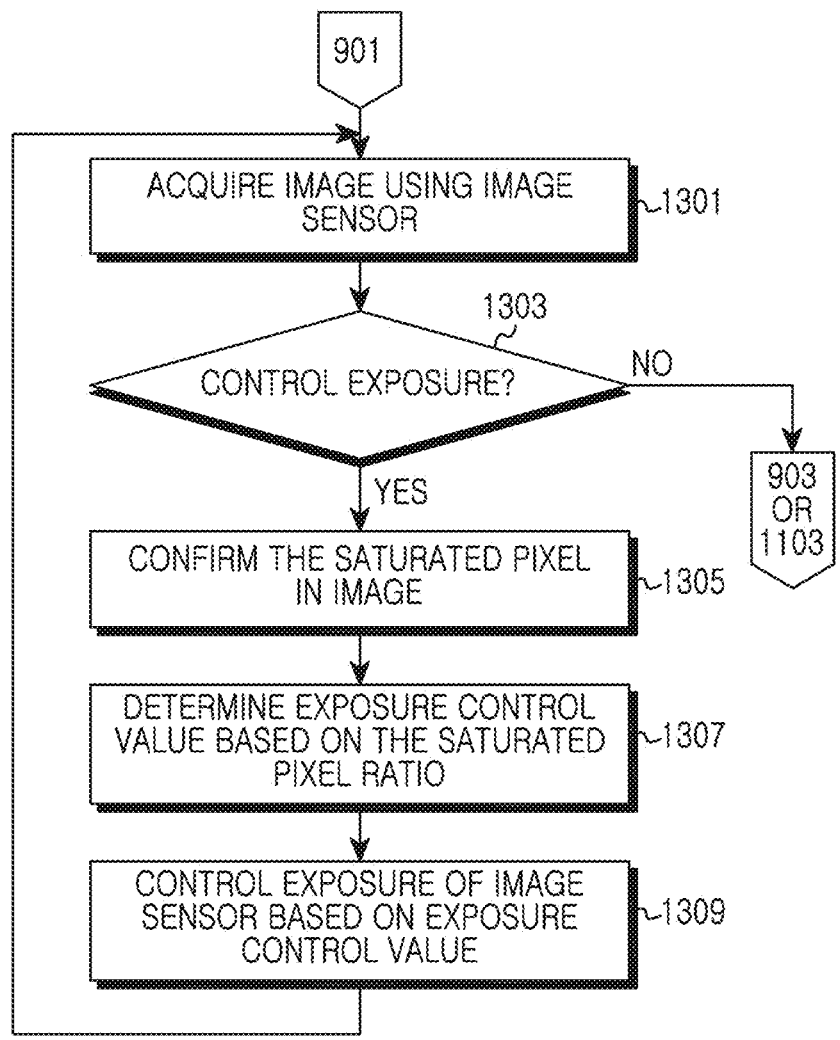
FIG. 13 illustrates a method for controlling the exposure in the electronic device according to an embodiment of the present disclosure.

FIG. 13 illustrates a method for controlling the exposure in the electronic device according to an embodiment of the present disclosure. Hereafter, the exposure control is explained using exposure control graphs of FIGS. 14A and 14B.

Figure 14A:
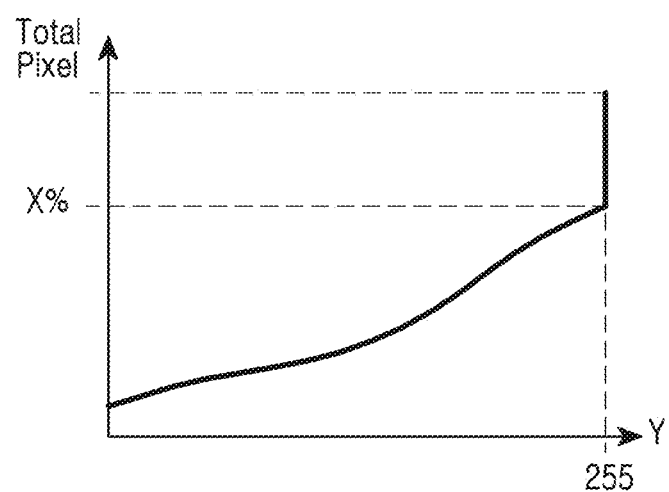
FIGS. 14A and 14B illustrate the exposure control in the electronic device according to various embodiments of the present disclosure.
Figure 14B:
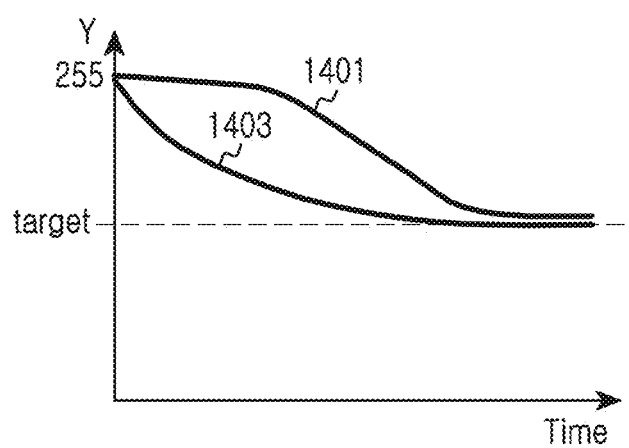

FIGS. 14A and 14B illustrate the exposure control in the electronic device according to various embodiments of the present disclosure.

Referring to FIG. 13, after dividing the pixels of the image sensor module 120 to the at least two groups of the different exposures in operation 901 of FIG. 9, the electronic device 100 may obtain the image through the image sensor module 120 in operation 1301.

In operation 1303, the electronic device 100 may determine whether to adjust the exposure of the pixels of the image sensor module 120. For example, the electronic device 100 may determine whether to adjust the exposure of the pixels of the image sensor module 120 based on the exposure level (e.g., the ratio or the number of the pixels exceeding the preset exposure) of the pixels of the image sensor module 120 using the image acquired by the image sensor module 120. For example, when 98% of total pixels include the exposure control condition which is set to 240 codes and a cumulative pixel graph of the image sensor module 120 does not satisfy the exposure control condition as shown in FIG. 14A, the electronic device 100 may determine to adjust the exposure of the pixels of the image sensor module 120. For example, the electronic device 100 may determine whether to adjust the exposure of the pixels of the image sensor module 120 based on the ratio or the number of the underexposed pixels of the image sensor module 120 using the image acquired by the image sensor module 120.

When determining to adjust the exposure of the pixels of the image sensor module 120 in operation 1303, the electronic device 100 may identify the saturated pixel (e.g., the pixel exceeding the preset exposure value) using the image acquired by the image sensor module 120 in operation 1305. Herein, the saturated pixel may indicate the pixel displayed with a maximum value (e.g., 255 codes) of the electronic device 100 among the pixels of the image sensor module 120.

In operation 1307, the electronic device 100 may determine the exposure control value based on the ratio of the saturated pixels. For example, the electronic device 100 may determine the exposure control value based on the ratio of the saturated pixels using Equation 1.

$$\text{control } Ev = Ev_{current} + \Delta Ev$$

$$\Delta Ev = L_{screen} - L_{target} + a \qquad \text{Equation 1}$$

In Equation 1, control Ev denotes the exposure value for a next frame, $Ev_{current}$ denotes the exposure value of a current frame, $\Delta Ev$ denotes the exposure control value, $L_{screen}$ denotes a luminance of the image acquired by the image sensor module 120, $L_{target}$ denotes a target luminance of the image acquired by the image sensor module 120, and a denotes a weight corresponding to the saturated pixel ratio. The electronic device 100 may increase the weight a as the saturated pixel ratio rises in Equation 1. For example, the electronic device 100 may determine the weight corresponding to the saturated pixel ratio using the weight table corresponding to the saturated pixel ratio.

In operation 1309, the electronic device 100 may control the exposure of the pixels of the image sensor module 120 based on the exposure control value.

Next, the electronic device 100 may re-obtain the image through the image sensor module 120 based on the changed pixel exposure in operation 1301.

When determining not to adjust the exposure of the pixels of the image sensor module 120 in operation 1303, the electronic device 100 may obtain one image (e.g., one HDR image) by combining the image information acquired by at least one pixel of the groups in operation 903 of FIG. 9, or set the reference exposure value using the brightness distribution of at least part of the image in operation 1103 of FIG. 11.

As such, when dynamically controlling the exposure control value based on the saturated pixel ratio, the electronic device 100 may shorten the exposure control time of the dynamic exposure control 1403, compared to no dynamic exposure control 1401 as shown in FIG. 14B.

A method for acquiring an image in an electronic device may include acquiring a first image using an image sensor which comprises a plurality of first pixels having a first exposure and a plurality of second pixels having a second exposure, determining a reference exposure value based on the image information, adjusting at least one of the first exposure or the second exposure based on the reference exposure value, and acquiring a second image using the image sensor based on the exposure control.

The acquiring of the second image may include acquiring a third image using the first pixels and acquiring a fourth image using the second pixels based on the exposure control, and acquiring the second image by combining the third image and the fourth image.

The first exposure and the second exposure may include an exposure time for the first pixels and the second pixels respectively.

The second exposure may be greater than or equal to the first exposure.

The first pixels may include at least one SEP, and the second pixels may include at least one LEP.

The determining of the reference exposure value may include determining the reference exposure value further using at least one of a weight corresponding to a location of the electronic device, a back light level, a color, and a face detection auto exposure, based on a brightness value of the first image.

The adjusting of the exposure may include comparing a reference range covering the reference exposure value with the first exposure and the second exposure, and adjusting at least one, outside the reference value, of the first exposure or the second exposure.

The adjusting of the exposure may include adjusting at least one, outside the reference value, of the first exposure or the second exposure with a maximum value of the reference range.

Before comparing, the method may further include detect the first exposure and the second exposure based on the first image.

The detecting may include identifying a saturation level of pixels of the image sensor using the first image, determining whether to adjust the exposure of the pixels of the image sensor based on the saturation level, and when determining not to adjust the exposure of the pixels of the image sensor, detecting exposures of the first pixels and the second pixels at the first image acquisition, as the first exposure and the second exposure.

The method may further include, when determining to adjust the exposure of the pixels of the image sensor, identifying a saturated pixel of the image sensor using the first image, and adjusting at least one of the first exposure or the second exposure based on a ratio or the number of saturated pixels.

The adjusting may include determining an exposure control value of at least one of the first exposure or the second exposure using a weight corresponding to the ratio or number of the saturated pixels.

As set forth above, the electronic device and the method control the exposure of at least one pixel used to adjust the dynamic range of the image based on the brightness value of at least part of the image information acquired by the image sensor, and thus enhance the quality of the image (e.g., the HDR image).

The electronic device may shorten the reference exposure setting time for the image capturing by dynamically determining the exposure control value based on the exposure of the pixels of the image sensor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for acquiring an image in an electronic device, the method comprising:
   acquiring a first image using an image sensor that comprises a plurality of first pixels having a temporary first exposure and a plurality of second pixels having a temporary second exposure;
   detecting a reference exposure value based on information of the first image;
   adjusting at least one of the first exposure or the second exposure based on the reference exposure value; and
   acquiring a second image using the image sensor based on the adjusted at least one of the first exposure or the second exposure,
   wherein the information of the first image includes at least one of a weight corresponding to a location of the electronic device and a face detection auto exposure,
   wherein the adjusting of the at least one of the first exposure or the second exposure comprises:
       comparing a reference range corresponding to the reference exposure value with the first exposure and the second exposure; and
       adjusting at least one, outside the reference range, of the first exposure or the second exposure based on the compared result
       to be a maximum value of the reference range.

2. The method of claim 1, wherein the acquiring of the second image comprises:
   acquiring a third image using the first pixels and acquiring a fourth image using the second pixels based on the exposure control; and
   acquiring the second image by combining the third image and the fourth image.

3. The method of claim 1, wherein the first exposure and the second exposure comprise an exposure time for the first pixels and the second pixels respectively.

4. The method of claim 1, wherein the first pixels comprise at least one short exposure pixel (SEP), and
   the second pixels comprise at least one long exposure pixel (LEP).

5. The method of claim 1, wherein the detecting of the reference exposure value comprises:
   detecting the reference exposure value further using at least one of a back light level and a color.

6. The method of claim 1, further comprising:
   identifying, before the comparing, a saturation level of pixels of the image sensor using the first image;
   determining whether to adjust the exposure of the pixels of the image sensor based on the saturation level; and
   detecting, when determining not to adjust the exposure of the pixels of the image sensor, exposures of the first pixels and the second pixels while acquiring the first image, as the first exposure and the second exposure.

7. The method of claim 6, further comprising:
   identifying, when determining to adjust the exposure of the pixels of the image sensor, a saturated pixel of the image sensor using the first image; and
   adjusting at least one of the first exposure and the second exposure based on a ratio or the number of saturated pixels.

8. The method of claim 7, wherein the adjusting of the at least one of the first exposure and the second exposure based on the ratio or the number of saturated pixels comprises:
   detecting an exposure control value of at least one of the first exposure and the second exposure using a weight corresponding to the ratio or number of the saturated pixels.

9. An electronic device comprising:
   an image sensor comprising an array of pixels configured to acquire image data from the array of the pixels; and
   at least one processor configured to process the image data,
   wherein the array of the pixels comprises a plurality of first pixels having a temporary first exposure and a plurality of second pixels having a temporary second exposure,
   wherein the processor is configured to:
       acquire a first image using the image sensor,
       detect a reference exposure value based on information of the first image, adjust at least one of the first exposure or the second exposure based on the reference exposure value, and acquire a second image using the image sensor based on the adjusted at least one of the first exposure or the second exposure, wherein the information of the first image includes at least one of a weight corresponding to a location of the electronic device and a face detection auto exposure, and wherein the at least one processor is further configured to:

compare a reference range corresponding to the reference exposure value with the first exposure and the second exposure, and adjust at least one, outside the reference range, of the first exposure or the second exposure based on the compared result to be a maximum value of the reference range.

10. The electronic device of claim 9, wherein the processor is further configured to:

acquire a third image using the first pixels based on the exposure control, simultaneously acquire a fourth image using the second pixels, and acquire the second image by combining the third image and the fourth image.

11. The electronic device of claim 9, wherein the first exposure and the second exposure comprise an exposure time for the first pixels and the second pixels respectively.

12. The electronic device of claim 9, wherein the first pixels comprise at least one short exposure pixel (SEP), and wherein the second pixels comprise at least one long exposure pixel (LEP).

13. The electronic device of claim 9, wherein the processor is further configured to detect the reference exposure value further using at least one of a back light level and a color.

14. The electronic device of claim 9, wherein the processor is further configured to:

determine whether to adjust the exposure of the pixels of the image sensor based on a saturation level of pixels of the image sensor using the first image, and detect, when determining not to adjust the exposure of the pixels of the image sensor, exposures of the first pixels and the second pixels at the first image acquisition, as the first exposure and the second exposure.

15. The electronic device of claim 14, wherein the processor is further configured to:

identify, when determining to adjust the exposure of the pixels of the image sensor, a saturated pixel of the image sensor using the first image, and adjust at least one of the first exposure and the second exposure based on a ratio or the number of saturated pixels.

16. The electronic device of claim 14, wherein the processor is further configured to detect an exposure control value of at least one of the first exposure and the second exposure using a weight corresponding to the ratio or the number of the saturated pixels.

* * * * *